(12) United States Patent
Brun et al.

(10) Patent No.: US 7,788,085 B2
(45) Date of Patent: Aug. 31, 2010

(54) SMART STRING REPLACEMENT

(75) Inventors: Caroline Brun, Grenoble (FR); Herve Dejean, Grenoble (FR); Caroline Hagege, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1100 days.

(21) Appl. No.: 11/013,366

(22) Filed: Dec. 17, 2004

(65) Prior Publication Data

US 2006/0136352 A1     Jun. 22, 2006

(51) Int. Cl.
| | |
|---|---|
| G06F 17/27 | (2006.01) |
| G06F 17/20 | (2006.01) |
| G06F 17/21 | (2006.01) |
| G06F 17/24 | (2006.01) |
| G06F 9/45 | (2006.01) |

(52) U.S. Cl. .............................. 704/9; 704/1; 715/255; 715/256; 715/271; 717/142; 717/143

(58) Field of Classification Search ................. 704/260, 704/261, 231, 258, 259, 263, 1–10
See application file for complete search history.

(56) References Cited

U.S. PATENT DOCUMENTS

| | | | | |
|---|---|---|---|---|
| 5,559,693 | A * | 9/1996 | Anick et al. .................... | 704/9 |
| 5,642,522 | A | 6/1997 | Zaenen et al. | |
| 5,794,050 | A * | 8/1998 | Dahlgren et al. ............ | 395/708 |
| 5,873,660 | A | 2/1999 | Walsh et al. | |
| 6,012,075 | A | 1/2000 | Fein et al. | |
| 6,035,269 | A * | 3/2000 | Kim ............................... | 704/9 |
| 6,085,206 | A * | 7/2000 | Domini et al. ............... | 715/257 |
| 6,321,372 | B1 | 11/2001 | Poirier et al. | |
| 6,356,865 | B1 * | 3/2002 | Franz et al. .................... | 704/2 |
| 6,393,389 | B1 | 5/2002 | Chanod et al. | |
| 7,475,010 | B2 * | 1/2009 | Chao ............................ | 704/10 |
| 2002/0128819 | A1 | 9/2002 | Jessee et al. | |
| 2002/0133331 | A1 | 9/2002 | Kharrat | |
| 2003/0074187 | A1 | 4/2003 | Ait-Mokhtar et al. | |
| 2004/0024584 | A1 * | 2/2004 | Brill ............................... | 704/9 |
| 2004/0107088 | A1 * | 6/2004 | Budzinski .................... | 704/10 |
| 2004/0117184 | A1 | 6/2004 | Privault et al. | |
| 2004/0128122 | A1 | 7/2004 | Privault et al. | |

OTHER PUBLICATIONS

Ait-Mokhtar, Salah et al. "Robustness Beyond Shallowness: Incremental Deep Parsing", in a special issue of the NLE Journal, 2002.
Bauer, Daniel et al. "LOCOLEX: The Translation Rolls off Your Tongue", published in Proceedings of ACH-ALLC, Santa-Barbara, USA, 1995.
Breidt, Lisa et al. "Formal Description of Multi-word Lexemes with the Finite State Formalism: IDAREX", Proceedings of COLING, Aug. 5-9, Copenhagen, 1995.

(Continued)

*Primary Examiner*—Richemond Dorvil
*Assistant Examiner*—Matthew H Baker
(74) *Attorney, Agent, or Firm*—Fay Sharpe LLP

(57) ABSTRACT

String replacement is performed in text using linguistic processing. The linguistic processing identifies the existence of direct or indirect links between the string to be replaced and other strings in the text. Morphological, syntactic, anaphoric, or semantic inconsistencies, which are introduced in strings with the identified direct or indirect links to the string that is to be replaced are detected and corrected.

20 Claims, 10 Drawing Sheets

OTHER PUBLICATIONS

Brill, Eric "A Simple Rule-based Part of Speech Tagger", ACH/ALLC, University of California, Santa Barbara, Jul. 11-15, 1995.

Brun, "A Client/Server Architecture for Word Sense Disambiguation", 18th International Conference on Computational Linguistics (COLING'2000), Saarbrücken, Germany, Aug. 2000.

Brun, Segond, "Semantic Eencoding of Electronic Documents", International Journal of Corpus Linguistic, vol. 6, No. 1, 2001.

Chanod, Jean-Pierre and Tapanainen, Pasi "Tagging French Text: Tagset, Dedicated Lexicons and Guesser", Proceedings From Texts To Tags: Issues In Multilingual Language Analysis, EACL SIGDAT workshop, Dublin, 1995.

Dini, Luca et al. "GINGER II: An Example-Driven Word Sense Disambiguator", Computers and the Humanities, vol. 34, Nos. 1/2, pp. 121-126, Apr. 2000.

Dini, Luca et al. "Error Driven Word Sense Disambiguation", Proceedings of the 17th International Conference on Computational Linguistics, Montreal, Quebec, Canada, Aug. 10-14, 1998.

Eisele, Andreas, "Terminology Replacement Based on Robust Morphosyntactic Analysis", Xerox Internal Report, 1999.

Ide, Nancy and Véronis, Jean, "Word Sense Disambiguation: The State Of the Art", Computational Linguistics, vol. 24 No. 1, Mar. 1998.

Jacquemin, Christian "Variation Terminologique : Reconnaissance et Acquisition Automatique de Termes et de Leurs Variantes en Corpus" Université De Nantes Institut de Recherche en Informatique de Nantes (IRIN), Jan. 1997.

Kallmeyer, Laura, "A Query tool for Syntactically Annotated Corpora", Proceedings of Joint SIGDAT Conference on Empirical Methods in Natural Language Processing and Very Large Corpora, Hong Kong, pp. 190-198, Oct. 2000.

Kanzaki, K. et al. "Classification of Adjectival and Non-adjectival Nouns Based on their Semantic Behavior by Using a Self-Organizing Semantic Map", COLING 2002 Workshop on Building and Using Semantic Networks, Taiwan, Sep. 2002.

Kaplan, Ronald and Bresnan, Joan, "Lexical-Functional Grammar: A Formal System for Grammatical Representation", chapter 2, pp. 29-130 in Mary Dalrymple, Ronald M. Kaplan, John T. Maxwell III and Annie Zaenen (editors), "Formal Issues in Lexical-Functional Grammar", CSLI Lecture Notes No. 47, CSLI Publications, Stanford, California, USA, 1995.

Karttunen, L. et al. "Regular Expressions for Language Engineering", Journal of Natural Language Engineering vol. 2, No. 4, pp. 305-328, Cambridge University Press, Dec. 1996, Revised Feb. 1997.

Kilgarriff, A. "SENSEVAL: An Exercise in Evaluating Word Sense Disambiguation Programs", Proc. LREC, Granada, pp. 581-588, May 1998.

Koskenniemi, Kimmo "A General Computational Model for Word-Form Recognition and Production" University of Helsinki, Department of General Linguistics, 1983.

Kupiec, J. "Robust Part-of-speech tagging using a hidden Markov model", Computer Speech and Language, vol. 6, pp. 225-242, 1992.

Kurlander, D. et al., "Graphical Search and Replace", Computer Graphics, vol. 22, No. 4, pp. 113-120, Aug. 1988.

Mitkov, Ruslan "An Integrated Model For Anaphora Resolution", Proceedings of the 15th conference on Computational linguistics, vol. 2, pp. 1170-1176, 1994.

Tapanainen, Pasi and Järvinen, Timo "A Non-projective Dependency Parser", Proceedings of the 5th Conference on ANLP (ANLP'97), pp. 64-71, Washington D.C., 1997.

Tapanainen, Pasi and Järvinen, Timo "Syntactic Analysis of Natural Language Using Linguistic Rules and Corpus-based Patterns", Proceedings of COLING-94. Kyoto, Japan, 1994.

Thanopoulos, Aristomenis et al. "Text Tokenization for Knowledge-free Automatic Extraction of Lexical Similarities" TALN 2003, Batz-sur-Mer, Jun. 11-14, 2003.

Trouilleux, François, "A rule based Pronoun Resolution System for French", Proc. of Discourse Anaphora and Anaphor Resolution Colloquium (DAARC 2002), Lisbon, Portugal, Sep. 18-20, 2002.

U.S. Appl. No. 10/739,191, entitled "Systems And Methods for Indexing Each Level Of The Inner Structure Of A String Over A Language Having A Vocabulary And A Grammar", filed Dec. 19, 2003.

U.S. Appl. No. 10/739,192, entitled "Systems And Methods For Searching Each Level Of The Inner Structure Of A String Over A Language Having A Vocabulary And A Grammar", filed Dec. 19, 2003.

* cited by examiner

Replace STRING1 with STRING2 in DOCUMENT

STRING1: voyant
STRING2: lampe

- ☒ Take into account syntactic relationships — 204
- ☒ Take into account anaphoric relationships — 206
- ☒ Take into account semantic relationships — 208
- ☒ Take into account ALL relationships above — 210

☐ Match case
☐ Find whole words only

[ OK ]  [ Cancel ]

*FIG. 2*

| STATE | SENSES FOR S1 | SENSES FOR S2 | SENSE INTERSECTION | ACTION |
|---|---|---|---|---|
| 1 | NONE | ONE OR MORE | NONE | OUTPUT WARNING: "INSUFFICIENT SEMANTIC INFORMATION EXISTS TO CONTINUE" |
| 2 | ONE | NONE | NONE | PERFORM STRING REPLACEMENT |
| 3 | TWO OR MORE | NONE | NONE | OUTPUT REQUEST FOR INPUT: "SELECT FROM LIST ONE OF THE SENSES OF STRING1" |
| 4 | ONE OR MORE | ONE OR MORE | NO SENSES IN COMMON | OUTPUT WARNING "SEMANTIC COHERENCE OF TEXT MAY BE DISRUPTED AFTER STRING REPLACEMENT" |
| 5 | ONE OR MORE | ONE OR MORE | ONE SENSE IN COMMON | PERFORM STRING REPLACEMENT ACCORDING TO THE COMMON SENSE |
| 6 | ONE OR MORE | ONE OR MORE | MULTIPLE SENSES IN COMMON | OUTPUT (IF SEVENTH STATE FAILS) REQUEST FOR INPUT: "SELECT FROM LISTS ONE OF SENSES OF STRING1 AND STRING2" |
| 7 | ONE OR MORE | ONE OR MORE | ONE SENSE OF STRING1 IN TEXT IS SEMANTICALLY UNAMBIGUOUS | PERFORM STRING REPLACEMENT ACCORDING TO THE SEMANTICALLY UNAMBIGUOUS SENSE |

FIG. 8

| STRING TOKEN | BASE FORM | MORPHOLOGICAL CHARACTERISTICS | OFFSET |
|---|---|---|---|
| Information | information | pos:noun, num:sing, gen:fem | 0 |
| sur | sur | pos:prep | 1 |
| les | le | pos:det, def:+, num:plu, gen:inv | 2 |
| voyants | voyant | pos:noun, num:plu, gen:mas | 3 |
| : | : | pos:ponctuation | 4 |
| Un | un | pos:det, indef:+, num:sing, gen:mas | 5 |
| voyant | voyant | pos:noun, num:sing, gen:mas | 6 |
| indique | indiquer | pos:verb, time:pres, mode:ind, pers:13, num:sing | 7 |
| l' | le | pos:det, def:+, num:sing, gen:inv | 8 |
| état | état | pos:noun, num:sing, gen:mas | 9 |
| de | de | pos:prep | 10 |
| l' | la | pos:det, def:+, num:sing, gen:inv | 11 |
| alimentation | alimentation | pos:noun, num:sing, gen:fem | 12 |
| de | de | pos:prep | 13 |
| l' | la | pos:det, def:+, num:sing, gen:inv | 14 |
| imprimante | imprimante | pos:noun, num:sing, gen:fem | 15 |
| . | . | pos:ponctuation | 16 |
| Il | il | pos:pron, type:pers, num:sing, gen:mas | 17 |
| est | être | pos:cop, time:pres, mode:ind, pers:3, num:sing | 18 |
| carré | carré | pos:adj, num:sing, gen:mas | 19 |
| et | et | pos:conj, type:coord | 20 |
| est | être | pos:cop, time:pres, mode:ind, pers:3, num:sing | 21 |
| situé | situer | pos:verb, mode:particip, pers:123, num:sing, gen:mas | 22 |
| sur | sur | pos:prep | 23 |
| le | le | pos:det, def:+, num:sing, gen:mas | 24 |
| dessus | dessus | pos:noun, num:sing, gen:mas | 25 |
| de | de | pos:prep | 26 |
| l' | la | pos:det, def:+, num:sing, gen:inv | 27 |
| imprimante | imprimante | pos:noun, num:sing, gen:fem | 28 |
| . | . | pos:ponctuation | 29 |

FIG. 9

Information sur les voyants:
Un voyant indique l'état de l'alimentation de l'imprimante. Il est carré et est situé sur le dessus de l'imprimante.

FIG. 10

| No. | LINK TYPE | AGREEMENT | STRING:OFFSET, STRING:OFFSET |
|---|---|---|---|
| 1 | Determiner | gender & number | voyant:3, le:2 |
| 2 | Determiner | gender & number | voyant:6, un:5 |
| 3 | Subject | gender & number | indiquer:7, voyant:6 |
| 4 | Anaphora | gender & number | voyant:6, il:17 |
| 5 | Subject | gender & number | être:18, il:17 |
| 6 | Attribute | gender & number | il:17, carré:19 |
| 7 | Subject | gender & number | être:21, il:17 |
| 8 | Attribute | gender & number | il :17, situer:22 |

FIG. 11

SMART STRING REPLACEMENT

BACKGROUND AND SUMMARY

The following relates generally to methods, and apparatus therefor, for performing string replacements using natural language processing.

Generally, search and replace operations for searching in a document for a string and replacing it with another string are know. While such search and replace operations have become standard in most document processing applications, they have limited linguistic awareness. That is, such search and replace operations are not known to assess interrelationships between strings in the document (i.e., direct or indirect connections between the string that is being replaced and other strings in the document) to anticipate ambiguities that may be introduced when the replacement string is introduced into the document.

Accordingly it would be advantageous to provide a search and replace function that is adapted to warn or anticipate when inconsistencies in agreement may be introduced when performing a search and replace in a document (i.e., when elements in a document that linguistically depend on the string being replaced in the document require agreement with the replacement string). Further it would be advantageous to provide a search and replace function that is also adapted to assess the possible senses that the string to be replaced may have with the replacement string to determine whether the replacement's use in the document is semantically coherent.

In accordance with various embodiments described herein, there is provided a method, and apparatus, for replacing an existing string in textual content of one or a collection of documents with a replacement string while taking into account morpho-syntactic properties of the existing string and the replacement string (i.e., morphological features and part-of-speech categories). The morpho-syntactic properties of the contents of the document are assessed before the string replacement takes place, thereby allowing only those occurrences that satisfy user specifications to be replaced, and thereby resolving ambiguous relations (which resolution may be automatically determined and/or determined through user intervention) that may be introduced when the string replacement occurs (e.g., when plural and singular replacements exist for the replacement string in a document).

In accordance other of the various embodiments described herein, the method for replacing the existing string with the replacement string in textual content corrects other strings in the textual content that linguistically depend on the replacement string. A string in the textual content that linguistically depends on the replaced string may have a morphologic relation (e.g., in its person, number, or gender), a syntactic relation (e.g., in a part-of-speech), and/or an anaphoric relation (e.g., in pronoun/antecedent dependencies) with the replaced string. Dependencies may thus be identified that result from direct links between strings in the textual content and the replacement string and indirect links between strings in the textual content and the replacement string. Advantageously, linguistically related strings that are linked directly or indirectly with the string to be replaced are identified so that when the replacement string is introduced grammatical inconsistencies may be identified and corrected.

In accordance other of the various embodiments described herein, the method for replacing the existing string with the replacement string in textual content detects and alerts a user of semantic relationships that may cause variations in sense (i.e., meaning). The existence of semantic relationships is performed at a first level by evaluating the meaning of the strings on their own (i.e., evaluating whether the senses of the existing string and the replacement string are semantically coherent), and at a second level by identifying contextual inconsistencies introduced when the replacement string is introduced in a single-word or multiword expression that is within larger a string or within other strings that define a larger linguistic unit (i.e., evaluating whether the single-word or multiword expressions in which the replacement string is found are semantically coherent).

In accordance yet another of the various embodiments described herein, a method for replacing in a document a source string with a target string includes: morpho-syntactically disambiguating textual content of the document; identifying a set of string dependencies by detecting grammatical or anaphoric dependencies, or both, between strings in the textual content of the document; disambiguating one or more of gender, number, or part of speech with user specifications when the source string or the target string have more than one possible meaning; identifying occurrences of the source string in the document that satisfy the user specifications; identifying string relations from the set of string dependencies that define direct or indirect links, or both, to the source string; replacing each occurrences of the source string in the document that satisfy the user specifications with the target string; correcting grammatical or anaphoric inconsistencies, or both, in the string relations in the document that are introduced when the source string is replaced with the target string; and outputting the document.

In accordance a further of the various embodiments described herein, a method for replacing in a document a source string with a target string includes: morpho-syntactically disambiguating textual content of the document; identifying occurrences of the source string in the document that satisfy user specifications; identifying a first set of possible senses for the source string and a second set of possible senses for the target string; assessing whether replacing the source string having the first set of possible senses with the target string having the second set of possible senses is semantically coherent; and replacing each occurrences of the source string in the document that satisfy the user specifications with the target string; outputting a warning when the replacement of the source string with the target string is not semantically coherent; and outputting the document.

In accordance yet a further of the various embodiments described herein, a method for replacing in a document a source string with a target string includes: morpho-syntactically disambiguating textual content of the document; identifying a set of string dependencies by detecting grammatical dependencies between strings in the textual content of the document; disambiguating one or more of gender, number, or part of speech with user specifications when the source string or the target string have more than one possible meaning; identifying occurrences of the source string in the document that satisfy the user specifications; identifying string relations from the set of string dependencies that define direct or indirect links, or both, to the source string; replacing each occurrences of the source string in the document that satisfy the user specifications with the target string; correcting grammatical inconsistencies in the string relations in the document that are introduced when the source string is replaced with the target string; and outputting the document; wherein the disambiguation of the source string or the target string is performed before replacing each occurrences of the source string in the document that satisfy the user specifications with the target string.

BRIEF DESCRIPTION OF THE DRAWINGS

These and other aspects of the embodiments will become apparent from the following description read in conjunction with the accompanying drawings wherein the same reference numerals have been applied to like parts and in which:

FIG. 2 illustrates a user interface for performing string replacement with the application program shown in FIG. 1;

FIG. 8 illustrates different possible states that may arises after performing word sense disambiguation on the source string and the target string, and computing a sense intersection therefor; and FIGS. 9-12 illustrate an example string replacement performed in accordance with the embodiments disclosed herein.

DETAILED DESCRIPTION

The table that follows set forth definitions of terminology used throughout the specification, including the claims and Figures.

| Term | Definition |
| --- | --- |
| string | any sequence of characters or symbols, such as, word fragments, words, phrases, sentence fragments, sentences, etc. |
| source string | specifies the string to be replaced in a document; alternatively referred to as "string1" and "S1" |
| target string | specifies the replacement string (i.e., the string to replace the source string in the document); alternatively referred to as "string2" and "S2" |

A. Operating Environment

Figure 1:
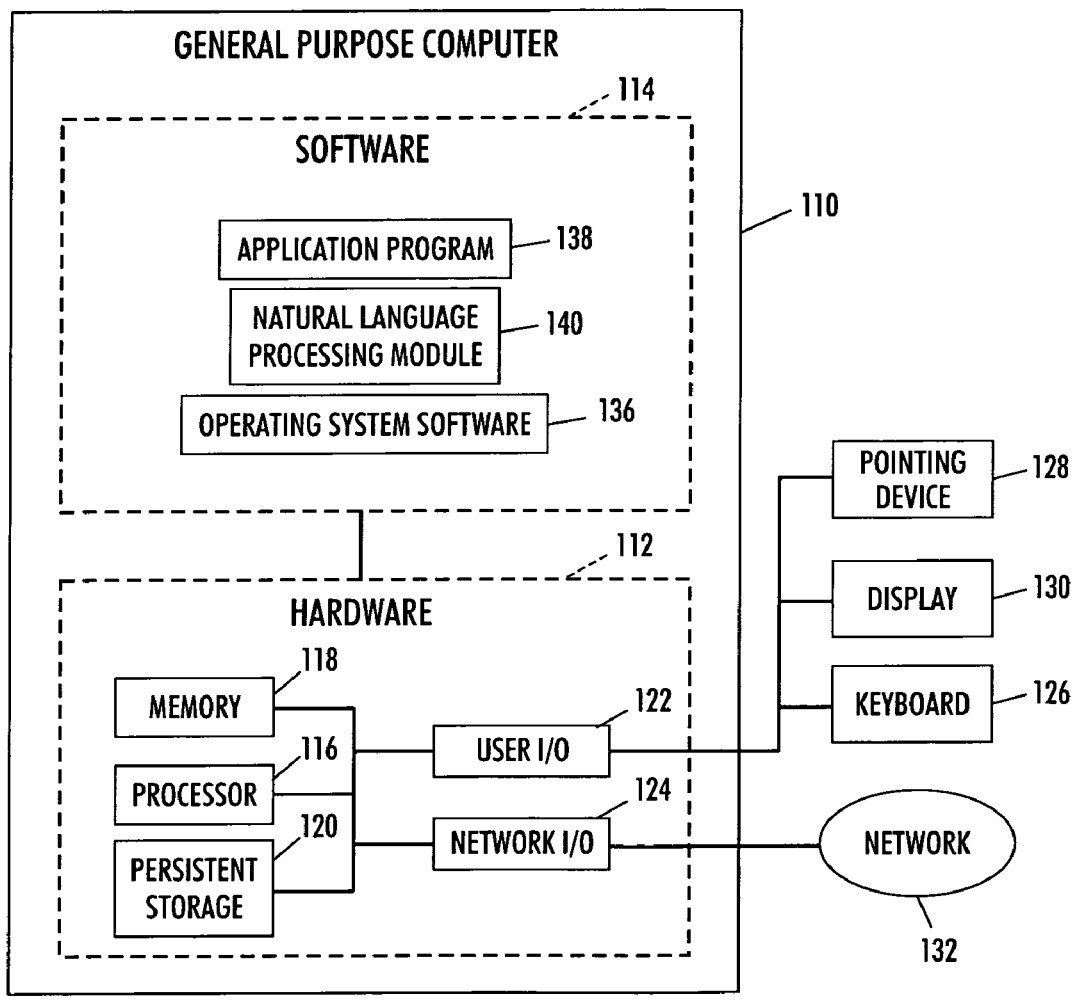
FIG. 1 illustrates a general purpose computer for carrying out the embodiments disclosed herein.

FIG. 1 illustrates a general purpose computer 110 for carrying out the embodiments disclosed herein. The general purpose computer 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a keyboard 126, a pointing device 128 (e.g., pointing stick, mouse, etc.), and a display 130. The network I/O 124 may for example be coupled to a network 132 such as the Internet. The software 114 of the general purpose computer 110 includes an operating system 136, an application program 138 and a natural language processing module 140.

In operation, the application program 138 processes in whole or in part natural language data, such as text. Generally, such application programs permit the creation of and/or the editing of textual content in documents. Example application programs include, document processing applications and spreadsheet applications. The application program 138 invokes the natural language processing module 140 to morpho-syntactically disambiguate strings in textual content (e.g., to identify a string's parts-of-speech (such as noun, preposition, and verb), morphological features (such as, person and number), and dependencies (such as, relationships between words within a sentence or between sentences)).

FIG. 2 illustrates a user interface 200 for string replacement of the application program 138 that may be invoked by a user when editing or creating a document to replace a source string with a target string globally within the document or within a selected section of the document (where a "string" may be any combination of characters or symbols, e.g., words such as "online" or phrases such as "online dictionary"). In the user interface 200, the user is given various options for performing linguistically aware string replacement. At 204, 206, 208, and 210 in the user interface 200, the user may specify that the string replacement take into account one or more relationships between the replacement string and other strings in the textual content of the document.

The relationships that are taken into account when a string replacement is made in the textual content of the document may include: "morphological relationships" (e.g., dependencies that require grammatical agreement to account for changes in gender, number, case, and/or person that are caused when the string replacement takes place), "syntactic relationships" (e.g., dependencies between parts-of-speech), "anaphoric relationships" (e.g., dependencies between a pronoun and its antecedent), and "semantic relationships" (e.g., changes in sense to single-word or multiword expressions, which include: idiomatic expressions, proverbial sayings, phrasal verbs, lexical and grammatical collocations, and compound terms).

Figure 3:
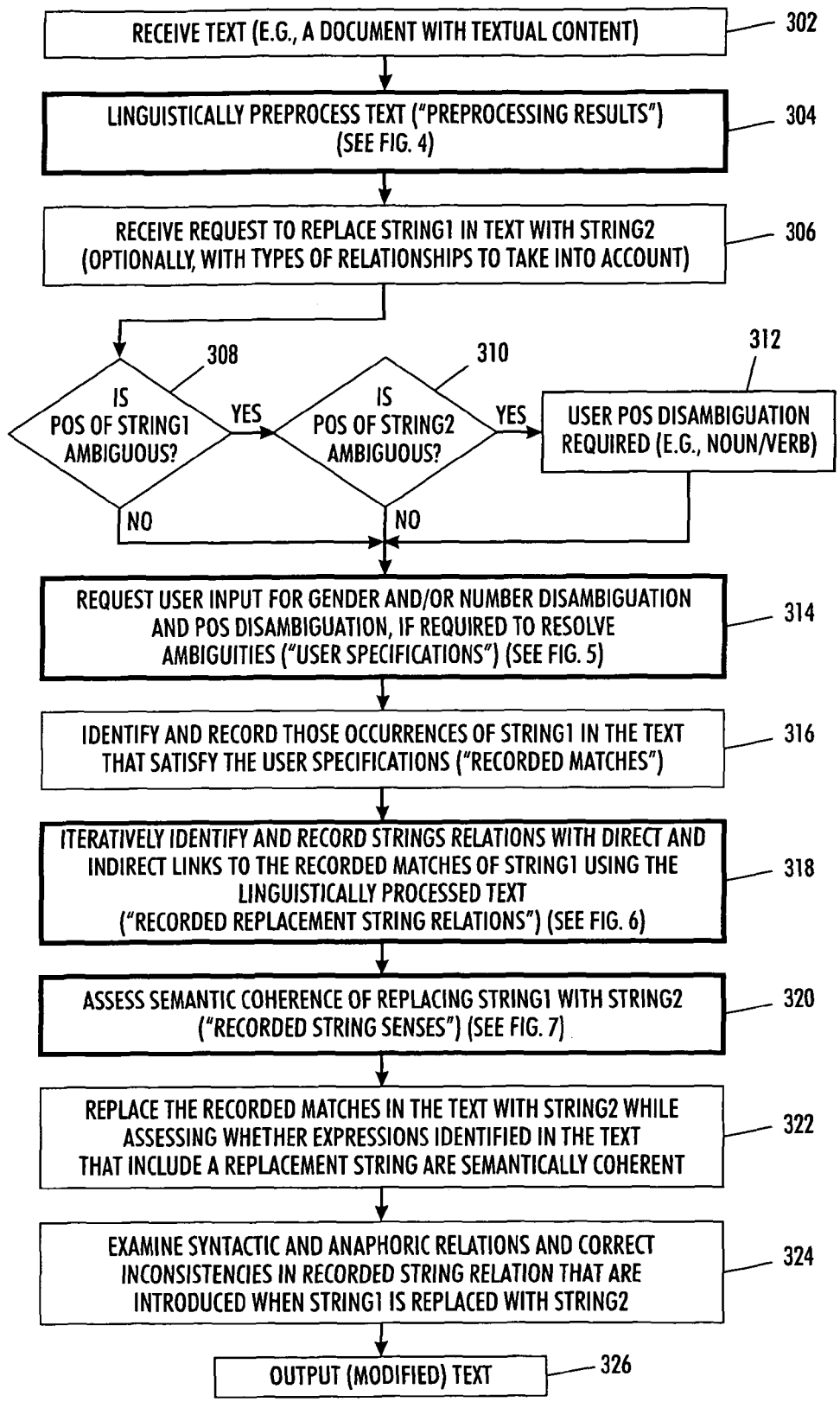
FIG. 3 is a flow diagram of one embodiment in which the application program and natural language processing module shown in FIG. 1 operate to carry out string replacement invoked by a user through, for example, the user interface shown in FIG. 2.
Figure 4:
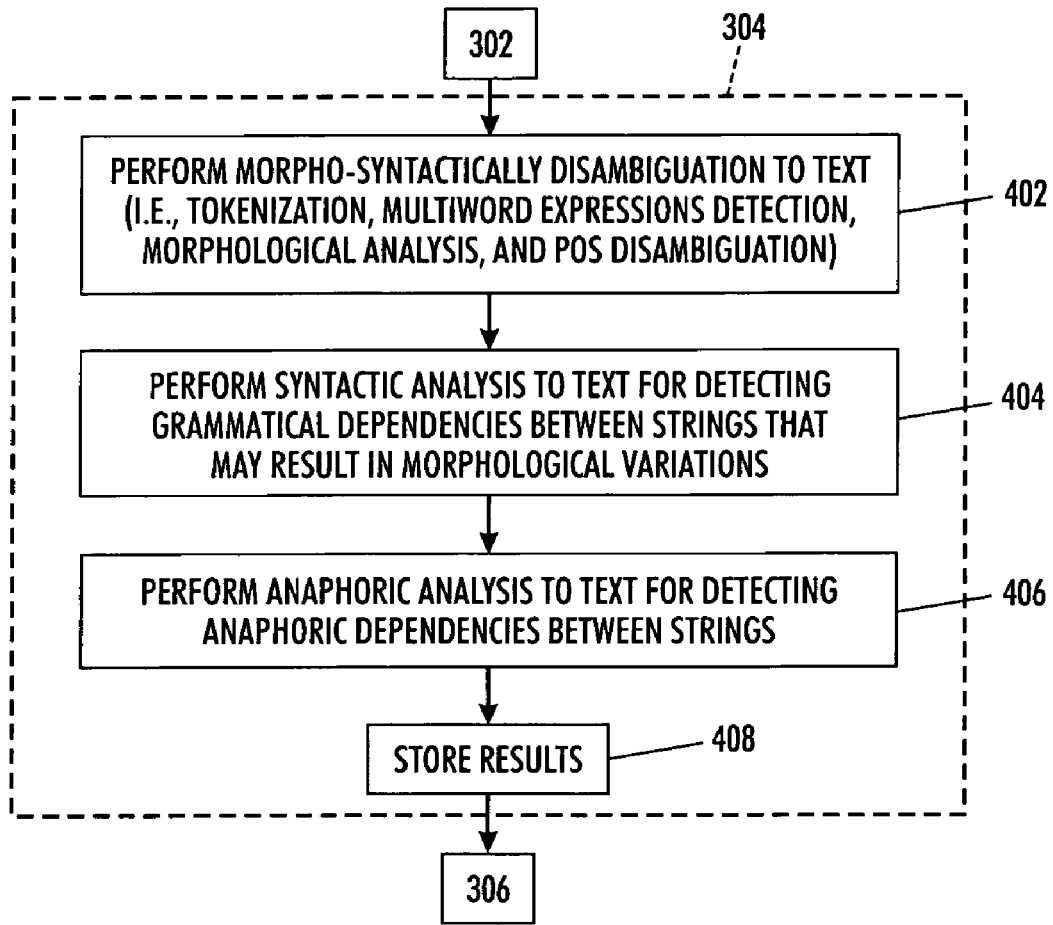
FIG. 4 is a flow diagram setting forth different preprocessing functions performed to the textual content of a document for which a string replacement is to be performed.

FIG. 3 is a flow diagram of one embodiment in which the application program 138 and natural language processing module 140 shown in FIG. 1 operate (integrally, as a single program, or separately, as two or more programs) to carry out string replacement invoked by a user through, for example, the user interface shown in FIG. 2. At 302, the natural language processing module 140 receives text, which in one embodiment is textual content in a document. At 304, the textual content of the document is linguistically preprocessed to define "preprocessing results", the details of which are outlined in FIG. 4. In one embodiment, the textual content may be produced by performing OCR (optical character recognition) on image data.

B. Linguistic Preprocessing

Generally, in preprocessing textual content in the document(s) for which string replacement is to be performed, the natural language processing application 140 shown in FIG. 1 analyzes at multiple levels text to collect information concerning morphological information, part-of-speech disambiguation, syntactic dependencies, anaphoric dependencies, and semantic relationships in the textual content of the document. Such preprocessing functions may be partially and/or fully performed in background. Further, such preprocessing functions may be invoked as soon as a user accesses (e.g., opens) a document with textual content or once a document is stored in a specified location (e.g., before the document is ever accessed).

In general, the purpose of the multi-level linguistic analysis performed at 304 is to recognize the morphological forms of the lexical forms in the textual content and to calculate morphological correlations between the forms and other syntactically related and/or anaphorically related forms in the textual content. For example, in the sentence "my friends are nice and I love them", the multi-level linguistic analysis recognizes that "friends", "are", and "them" are plural forms, and that the verb "are" is plural because its syntactic subject is the plural noun of "friends" and also that the pronoun "them" refers to "my friends".

More specifically, the various levels of linguistic analysis may be defined as morph-syntactic analysis, syntactic analysis and anaphoric resolution (for morphological dependency detection). Each is discussed, in turn, in more detail below with reference to FIG. 4, which is a flow diagram setting forth the different preprocessing functions performed to the textual content of a document for which a string replacement is to be performed.

At 402, the textual content is morpho-syntactically analyzed, which includes tokenizing the text followed by morphological analysis and tagging the tokenized text. Tokenization involves the detection of linguistic units of text. Each token is associated with its corresponding base form (i.e., lemma) together with its morphological characteristics (e.g., part-of-speech, number, gender, time, etc.) that disambiguate the token.

For example, Table 1 illustrates the morpho-syntactic analysis of the sentence "remove the toner container and shake it gently". Each entry in the first column in Table 1 corresponds to a token in the sentence. Each entry in the second column of Table 1 corresponds to the base form (or lemma) of the token. Each entry in the third column of Table 1 corresponds to the morphological characteristics of the token. Due to the disambiguation analysis performed, the possible different forms that a token may have are identified based upon its use in the sentence. For example in this sentence, the token "shake", which may take the form of a verb or a noun, is disambiguated as a verb in the imperative form.

TABLE 1

| TOKEN | BASE FORM | MORPHOLOGICAL CHARACTERISTICS |
|---|---|---|
| remove | remove | pos:verb, mode:imperative |
| the | the | pos:article, def:+, number:NUM |
| toner | toner | pos:noun, number:singular |
| container | container | pos:noun, number:singular |
| and | and | pos:conjunction |
| shake | shake | pos:verb, mode:imperative |
| it | it | pos:pronoun, number:singular, case:accusative |
| gently | gently | pos:adverb, type:manner |

In addition at 402, morpho-syntactic analysis may include multiword tokenization. Such multiword tokenization may tokenize the textual input into non-isolated units (i.e., units that comprise more than a contiguous string). For example, basic tokenization will isolate four tokens (i.e., one for each word) in the sentence "the plane took off". In contrast, semantic tokenization will isolate three tokens, identifying the strings "took" and "off" as a single semantic unit or token "took off". Once identified, the multiword expression, possibly together with its sense if simultaneously detected, is recorded with the other information resulting from other preprocessing performed (e.g., as shown in Table 1).

Further at 402, morpho-syntactic analysis may include lexical semantic disambiguation to determine the sense of strings (e.g., single word or multi-word expressions) in the textual content. While multiple senses may belong to a string (i.e., polysemous words), the string's use in a sentence will apply to only one of the sense. Word sense disambiguation, or lexical semantic disambiguation detects the meaning of strings used in a given context. Such disambiguation techniques rely on a set of senses attached to each word or multiword (e.g., senses that are defined in a dictionary), and may rely on supervised and unsupervised learning techniques, as well as, symbolic approaches, or a combination of both. In one embodiment, senses of strings are detected using the WordNet® lexical reference system, the details of which is published by Fellbaum, in "WordNet: An Electronic Lexical Database", MIT Press, Cambridge, Mass., 1998. Once the senses of strings in the textual content is determined, they are recorded with the other morphological characteristics associated with the corresponding token (e.g., as shown in Table 1).

At 404, syntactic analysis is performed to the textual content to detect grammatical dependencies that may result in morphological variations. The purpose of this syntactic analysis is to discover morphological dependencies between syntactically related lexical tokens, which require only knowledge of morphological agreement information. Those skilled in the art will appreciate that such grammatical information is highly language-dependent. For example, in highly inflected languages such as Spanish, the required information is greater than in lesser inflected languages such as English. For example, in Spanish there exist possible "determination" links that relate a definite article to its object (where the Spanish definite article may have the following morphological variations "el", "la", "los", or "las", which correspond respectively to the singular-masculine, singular-feminine, plural-masculine, and plural-feminine forms of the lemma "el"), whereas in English the same link does not exists because only one definite article exists "the", whether the object is singular or plural.

More specifically, Table 2 illustrates the output of a dependency analysis that may result when the syntactic analysis is performed at 404. In alternate embodiments, other syntactic approaches may be used at 404, such as, phrase structure grammars. The dependency analysis in Table 2 results from analyzing the sentence "los productos estan ordenados por su function principal", which is in Spanish. The output of the grammatical dependency are links that have been calculated for the sentence and for which there exists some morphological dependencies. The grammatical links shown in Table 2 are a subset of the complete list of dependencies that a parser is expected to identify.

The subset of links in Table 2 identifies only those links between dependencies for which morphological agreement has to apply. For example, link number 1 in Table 2 is a determination link between the lemma "producto" and the lemma "el" and the elements of this syntactic relation have to agree in gender and number. Accordingly, link number 1 captures the fact that a nominal head and its determiner have to agree in gender and number in Spanish.

TABLE 2

| No. | LINK TYPE | AGREEMENT | STRINGS |
| --- | --- | --- | --- |
| 1 | Determiner | gender & number | producto, el |
| 2 | Subject | gender & number | estar, producto |
| 3 | Attribute | gender & number | producto, ordenado |
| 4 | Possessive | gender | funcion, su |
| 5 | Modifier | gender & number | funcion, principal |

At 406, anaphoric analysis is performed to detect anaphoric dependencies, which entails processing textual content to identify anaphoric links. Of those anaphoric links identified, only those anaphoric links that affect the surface form of correlated strings are retained. For example, anaphoric links to the sentence "the members of my club introduced sailing to my mother" are identified in brackets "[ ]" in the sentence "we [the members] were happy when she [my mother] liked it [sailing]". Such anaphoric links may be affected by changes. For example, agreement in number or gender would have to be made with different forms in the sentence if "members" was replaced with "president", "mother" was replaced with "father", and "sailing" was replaced with "the members". Additional semantic links exist between "we" and "were", which may require agreement due to a change in number (e.g., if "members" is replace with "president" and "we" is replaced with "she" then "were" would need to be replaced with "was"). By way of another example, an anaphoric relation exists in the French sentence "retire le toner et agitez-le doucement" between the noun "toner" and the pronoun "le". In French, the pronoun "le", which refers to the noun "toner", can have three different forms "le", "la", and "les", corresponding respectively to masculine-singular, feminine-singular, and masculine/feminine-plural. In the sentence, the anaphoric relation between "toner" and "le" requires an agreement in gender and number.

In one embodiment, the preprocessing results computed at 402, 404, and 406 of are stored in a form that simplifies access for the initial and any subsequent search and replace operations performed to the textual content at 408. One such possible instantiation is described in the following U.S. patent application Ser. Nos., which are incorporated herein by reference: Ser. No. 10/739191, entitled "Systems And Methods For Indexing Each Level Of The Inner Structure Of A String Over A Language Having A Vocabulary And A Grammar"; and Ser. No. 10/739192, entitled "Systems And Methods For Searching Each Level Of The Inner Structure Of A String Over A Language Having A Vocabulary And A Grammar".

C. String Replacement

Referring again to FIG. 3, after linguistic preprocessing at 304, user input is received specifying a search string (i.e., string1) and a replacement string (i.e., string2), with possibly one or more different types of relationships to take into account, as illustrated in the interface 200 shown in FIG. 2. Subsequently, an assessment is made as to whether the parts-of-speech of string1 or string2 are ambiguous, at 308 and 310, respectively. If either part-of-speech (POS) is unambiguous, then the replacement may be done according to the unambiguous POS of the determined string.

At 308 and 310, there exist two levels of analysis to POS disambiguation of string1 and string2. At a first level of analysis, the string1 and string2 are examined for their parts-of-speech on their own (i.e., without reference to the textual content of the document), and in the event ambiguities exist, then at a second level of analysis of the string1 is performed with respect to the POS identified for each occurrence of string1 in the textual content of the document (i.e., within the context of the document). Consequently, there may exist a plurality of POS identified for different occurrences of string1 in the textual content of a document.

For example, if the string "place", which may be a noun or a verb, is to be replaced with the string "location", which is always a noun, then a determination is made at 308 that the POS of string1 is ambiguous and at 310 that the POS of string2 is unambiguous POS (i.e., the nominal form of place is selected to be the intended POS replacement). In the reverse case, if the string "location" is to be replaced with the string "place" then a determination is made at 308 that the POS of string1 is unambiguous by evaluating its POS label specified during preprocessing for each occurrence of the string in the document.

In the event that the POS of the two strings cannot be disambiguated then a determination is made that user POS disambiguation is required at 312. This may occur if the string to be replaced has multiple occurrences in the document that were labeled with different parts-of-speech during preprocessing. For example, if the string "price", which appears in the textual content of the document as both a noun and a verb, is to be replaced with "value", then user input is required to specify whether one or both of the POS of string1 are to be replaced at 314.

More generally at 314, user input is requested for gender and/or number and, if required, for POS disambiguation, which user input is together referred to herein as "user specifications". In one embodiment, an assessment is made of the possible gender and/or number that may be associated with string1 as it exists in the textual content of the document. This assessment identifies with respect to number, the occurrence of string1 in both singular and plural, thereby requiring disambiguation input from the user, or that only singular or only plural occurrences exist, thereby not requiring disambiguation input from the user.

Figure 5:
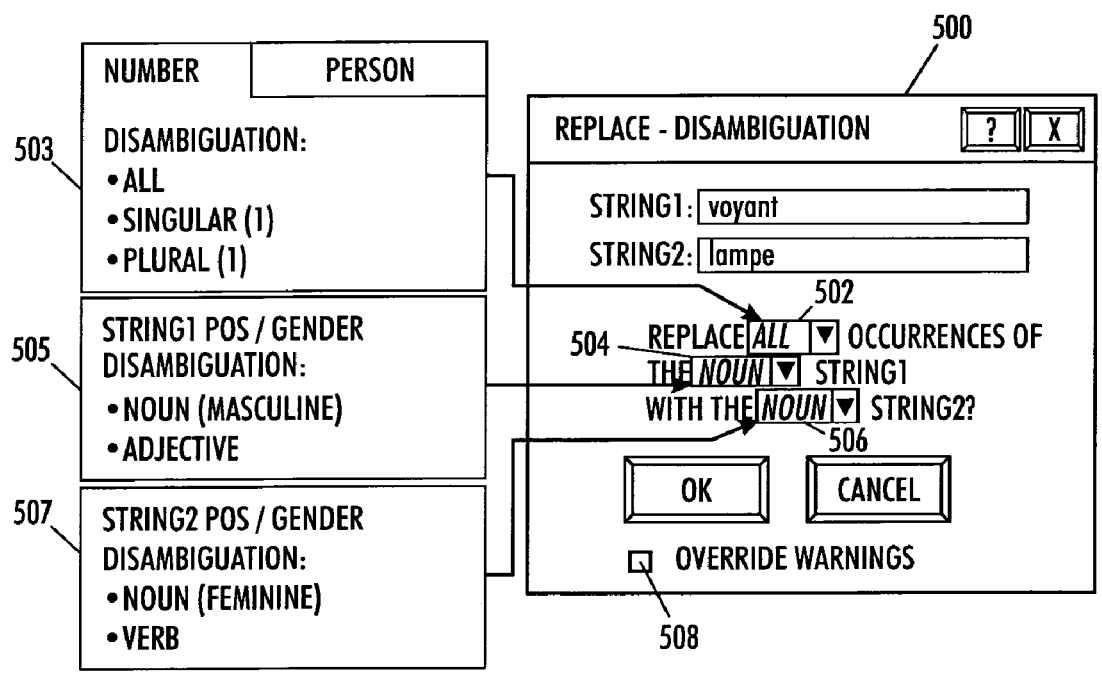
FIG. 5 illustrates a user interface for receiving user specifications concerning a string replace operation, which may include specifying ambiguities in one or more of, gender, number, POS, and case.

FIG. 5 illustrates a user interface 500 for receiving user specifications (i.e., disambiguation information or the confirmation of automatically determined disambiguation information) concerning a string search and replace operation, which may include one or more of, gender, number, POS, and case (e.g., when string1 or string2 is a proper noun). In the embodiment of the user interface 500 shown in FIG. 5, a user is presented with a selection menu for specifying number (and person) disambiguation input at 502 and gender disambiguation input 504 and 506, for string1 and string2, respectively. Associated with the selection menus 502, 504, and 506 are pop-up windows 503, 505, and 507 that provide details regarding the disambiguation. In the event the user interface 500 identifies gender conflicts (e.g., if the POS of string1 is specified as an adjective in the example shown) then a warning message would be presented to the user that POS may not be disambiguated. The user would have the option to override such warnings about identified POS ambiguities at 508.

In one embodiment, the user interface 500 is presented to the user each time a string replace is invoked even when no ambiguities exist in number, gender, POS, or case. In this way, the user is given feedback as to what assumptions the system is making with regard to the string replace operation in the textual content of the specified document. In alternate embodiments, the user interfaces shown in FIGS. 2 and 4 (including the sequence of operations shown in FIG. 3) are adapted to operate on a collection of documents. In this alternate embodiment, the disambiguation would be performed on the totality of the text in the document collection.

In addition to unambiguously specifying the parts-of-speech for the string to be replaced (e.g., as shown in FIG. 5), the user interface 500 is adapted to allow the user to correct ambiguities at the morphological level, which include, ambiguities related to number (e.g., singular, plural, or both), gender for nouns (e.g., in French masculine and feminine), person for verbs (e.g., in the present tense third-person singular, all persons, or all persons except third-person singular), and tense for verbs.

For example, in the event that homonyms (i.e., words that are spelled or pronounced alike but have different meanings) of the string to be replaced appear in the textual content of the document (e.g., "page" meaning in French either a waiter or a page of a document) then the replacement string must be disambiguated as to its gender (e.g., if "page", which is either a feminine or masculine noun in French, is to be replaced with "feuille", which is a feminine noun in French). A similar disambiguation in gender must be performed in the event "feuille" is to be replaced with "page". In one embodiment, these different possibilities are presented as options in the selection menus 504 and 506 (e.g., for "page" there may exist the following options: "noun (masculine)" meaning waiter or "noun (feminine)" meaning page of a document).

By way of another example, morphological ambiguity may exist in the event a user requests replacement of a string with only one or more inflected forms. For example, in the event the plural noun "voyant" is to be replaced with the plural noun "lampe", the system is adapted to consider only those occurrences that exist in the textual content of document. The user may clarify this morphological ambiguity in number using the menu 502 with the options 503 in the user interface 500 in the event both plural and singular forms of the string to be replaced exists by, for example, listing the number of times the occurrence of singular and/or plural occurrences of a noun were identified in the textual content of the document (as shown in FIG. 5).

By way of a further example, morphological ambiguity may exist when the surface form of the string to be replaced is a lemma. This may concern the person of verbs or the number of nouns. The user interface 500 is adapted to allow user specification of the person of a verb (in the event there is no agreement), for example, when the verb "happen" is to be replaced with the verb "occur". In this example, the user is given the option to specify whether to restrict replacement to the specific form of the specified strings or alternatively some or all inflected forms of the verbs (e.g., replace "happens" with "occurs", "happened" with "occurred", etc.). Further, the user interface 500 is adapted to allow a user to specify the replacement of nouns with different number, for example, when the noun "container" is to be replaced with "cartridges" (or vice-versa). In this example, the user is given the option to specify whether to restrict replacement to the specific form of the specified strings or alternatively some or all inflected forms of the nouns (e.g., replace in addition "containers" with "cartridges").

Referring again to FIG. 3, once ambiguities in the specified string replacement have been resolved at 314 with user specifications, the string replacement operation continues at 316 by identifying and recording all occurrences of the string to be replaced (i.e., string1) in the textual content of the document that satisfy the user specifications. The operation at 316 involves eliminating from the identified occurrences of the string1 in the textual content of the document those that do not satisfy the user specifications. The remaining set of matches is referred to as "recorded matches". In one embodiment each recorded match is identified at 316 using a string match, which is subsequently tested to meet user specifications (defined at 314) that specify the linguistic form(s) of string1 that may be replaced. In another embodiment, each recorded match is identified at 316 using a lemma search in the event the user specifications indicate all inflected forms of string1 (corresponding to a given lemma) that are to be replaced.

Figure 6:
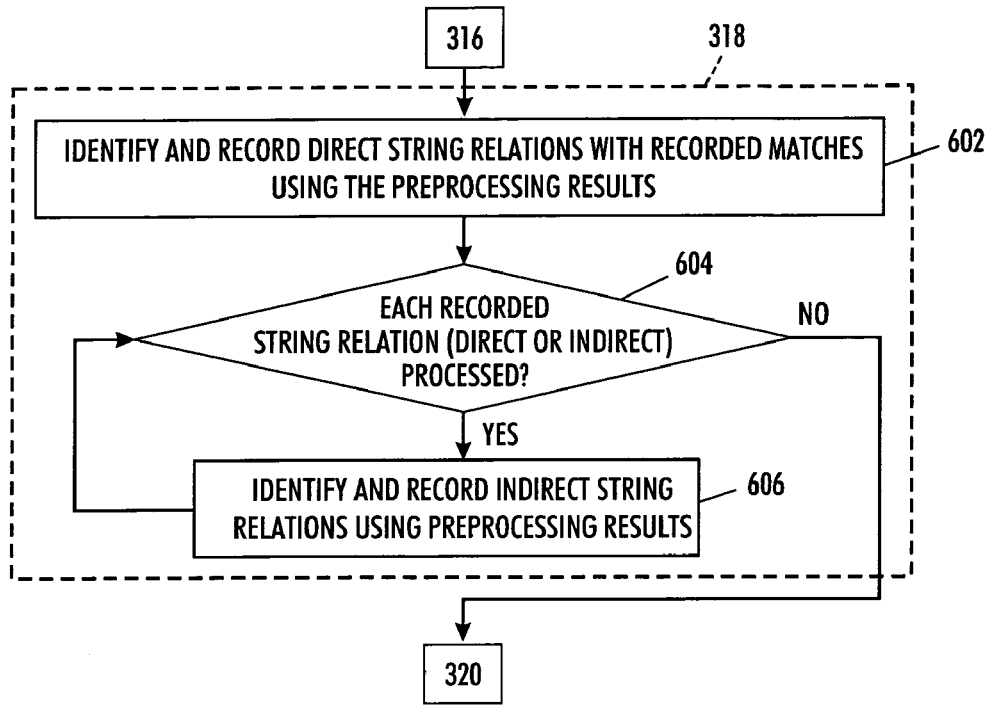
FIG. 6 illustrates one embodiment for identifying relations between the source string and other strings in the input text.

At 318, relations with direct and indirect links to the recorded matches (at 316) using the preprocessing results (computed at 304) are iteratively identified and recorded to define "recorded replacement string relations". FIG. 6 illustrates one embodiment for identifying recorded replacement string relations. Initially at 602, direct relations between recorded matches of the string to be replaced are identified using the preprocessing results (computed at 304). For each direct string relation identified at 602 or at 606, indirect relations with each direct relation are identified and recorded at 606. In addition, further indirect relations (e.g., a relation of a relation of string1) with each indirect relation identified at 606 are subsequently identified and recorded by repeating 604 and 606.

Figure 7:
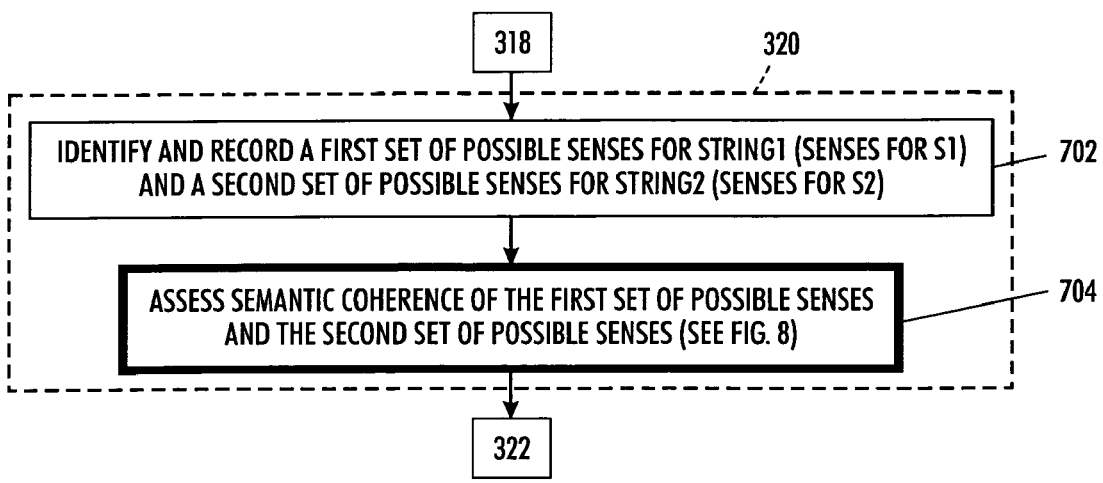
FIG. 7 illustrates one embodiment for assessing the semantic coherence of replacing the source string with the target string.

At 320, the semantic coherence of replacing string1 with string2 is assessed at two levels, the details of which are shown in the flow diagram in FIG. 7. At a first level, the semantic coherence of the sense of each string (i.e., the string to be replaced and the replacement string) is assessed without additional contextual information as to how the string to be replaced is used in the textual content. At a second level, the semantic coherence of the sense of the string to be replaced in the textual content is assessed.

Initially at 702, word sense disambiguation (e.g., using senses defined in a dictionary) is performed independently on the string to be replaced (i.e., string1) and for the replacement string (i.e., string2) to identify all possible senses for each string. Subsequently at 704, a sense intersection is computed for string1 and string2 to assess their semantic coherence.

FIG. 8 illustrates different possible states that may arise after performing word sense disambiguation on string1 and string2 and computing a sense intersection. States one through six concern the first level of semantic coherence, while state seven concerns the second level of semantic coherence. The first state arises when no senses are detected for the string to be replaced (i.e., string1 or S1) (e.g., string1 does not appear in the dictionary used for word sense disambiguation). When the first state occurs, a warning message is output that insufficient semantic information exists concerning string1 to allow a semantic coherence assessment to be performed.

The second state arises when there exists one sense detected for string1 and no senses detected for the replacement string (i.e., string2 or S2). When the second state occurs, the string replacement is performed as no apparent semantic incoherence is detected. The third state arises when there exists two or more senses detected for string1 but no senses detected for string2. When the third state occurs, an interface is output which requests that one of the plurality of senses of string1 be selected.

The fourth through seventh states arise when there exists one or more senses detected for both string1 and string2, yet their sense intersection may result in one of the following: (at state four) no senses in common; (at state five) one sense in common; (at state six) multiple senses in common; or (at state seven) multiple senses in common at the first level of analysis, yet at the second level, one sense of string1 in the textual content is unambiguous. In the event the fourth state occurs (i.e., the sense intersection identifies no senses in common), then a warning is output indicating that semantic coherence may be disrupted after string replacement is performed, thereby allowing the user to reject or confirm whether the string replacement should be performed. In the event the fifth state occurs (i.e., the sense intersection identifies one sense in common), then string replacement is allowed to occur.

The sixth and seventh states arise when sense intersection at the first level (or string level) fails to detect any senses in common. In the sixth and seventh states, a second level of sense detection is performed by examining the sense of the recorded matches of the string to be replaced in the textual content (at 316 in FIG. 3). In the event the sixth state occurs (i.e., the sense intersection identifies multiple senses in common), then a user interface is output which request that one of the plurality of senses of string1 and string2 be selected. In the event that an unambiguous use of the string in the context of the textual content is detected, the string replacement is allowed to proceed according to the semantically unambiguous sense detected in the textual content. Should more than one sense of string1 exist in the textual content, then each occurrence of the string is similarly identified as either falling under state 6 (i.e., as being semantically ambiguous) or state 7 (i.e., as being semantically unambiguous).

For example, if the string "carry" is replaced with the string "hold", word sense disambiguation (at 702 in FIG. 7) detects the three common senses detailed in Table 3, using, for example, the WordNet® lexical reference system, where synonym sets of nouns, verbs, adjectives and adverbs are organized to represent one underlying lexical concept. In the event that two of the senses of "carry" which were identified in the textual content during preprocessing (at 304 in FIG. 4), a user interface may offer (at 704 in FIG. 7) a user (with a description of the sense and example uses of the sense and) the possibility to select which sense is to be associated with each occurrence (or set of occurrences) in the textual content (which in one embodiment is performed on a word-by-word as replacements are made at 322).

TABLE 3

| STRING | SENSE DESCRIPTION |
| --- | --- |
| hold, carry, bear | support or hold in a certain manner; "She holds her head high"; He carried himself upright" |
| hold, carry, bear, contain | contain or hold; have within: "The jar carries wine"; "The canteen holds fresh water"; "This can contains water" |
| hold, carry | drink alcohol without showing ill effects; "He can hold his liquor"; "He had drunk more than he could carry" |

Referring again to FIG. 3, after assessing the semantic coherence of replacing string1 with string2 at 320, the recorded matches (identified at 316) are replaced at 322 with string2. In the event inflected forms of string1 that corresponds to a given lemma are to be replaced, each replacement string (i.e., string2) is morphologically generated. Morphological generation involves replacing a source string (i.e., string1) with a grammatically correct form of a target string (i.e., string2). In operation, morphological generation takes as input a lemma (i.e., a base form) and a morphological specification (i.e., a set of morphological features, e.g., number: plural) to produce an inflected form of the lemma according to the morphological specification. For example, morphological generation with the input of the lemma "cat" and the morphological specification of "number: plural" produces as output the linguistic form "cats".

In addition at 322, a determination is made as to whether any expressions (e.g., single-word or multiword) in the textual content contain the replacement string, and if so whether the replacement is semantically coherent. That is at 322, when the replacement string forms part of an expression identified during preprocessing at 304, the detected senses of the replacement string and the expression are assessed for semantic coherence. Those skilled in the art will appreciated that a common sense between the replacement string and a multiword expression will infrequently be detected as multiword expressions often have a very precise semantic meaning, which would thereby result a state similar to state four shown in FIG. 8 where semantic coherence of the textual content may be disrupted in the event the replacement occurs given the string to be replaced belongs to a detected multiword expression.

At 324, strings in the textual content with recorded replacement string (syntactic and anaphoric) relations (identified at 318) that are affected by the replacements performed at 320 are updated (e.g., required changes in agreement because the source and target strings are nouns with different gender). As recorded replacement string relations express morphological dependencies between a form that has just been replaced and other lexical items in the textual content, the morphological coherence of these related strings are examined as to their validity (or accuracy). If the morphological coherence is no longer valid, then morphological generation of the related string is performed in order to maintain grammatical coherence of string relations after string replacement is performed to correct identified inconsistencies (e.g., in agreement). After direct relations with the replacement string are corrected, indirect syntactic and anaphoric relations with the corrected relations are examined as to their validity and corrected in the event inconsistencies are identified. Dependent relation checking and correction continues until string relations in the textual content with links to the replacement string have been followed to string relations that are morphologically coherent (i.e., grammatically coherent).

At 326, upon completion of the string replacements at 322 and the string corrections at 324, the modified input text (i.e., output text) is output, which may include one or more of viewing (e.g., on a display), rendering (e.g., on a printer), transmission (e.g., by email and facsimile), and/or input to a subsequent process (e.g., editing in a word processing application).

D. Detailed Example

FIGS. 9-12 illustrate an example string replacement performed in accordance with the embodiment shown in FIG. 3, where a user specifies the replacement of the source string "voyant" with the target string "lampe" in the textual content or input text (in French) shown in FIG. 10. The example string replacement illustrates how replacing a source string with a target string affects not only the source string in the textual content but also lexical items that are related to the source string.

The output of linguistic preprocessing performed at 304 in FIG. 3 to the input text shown in FIG. 10 is shown in FIGS. 9 and 11. As detailed in FIG. 4, linguistic preprocessing involves linguistically analyzing the input text to detect syntactic relations, morphological agreement, and anaphoric relations. The preprocessing results shown in FIG. 9 set forth the morpho-syntactic disambiguation of the input text, which includes: in column 1 the tokenized string token (or surface form) from the input text; in column 2 the base form (or lemma) of the surface form; in column 3 the morphological characteristics of the base form; and in column 4 the offset of the string token from the beginning of the textual content. The preprocessing results shown in FIG. 11 set forth the syntactic and anaphoric processing of the input text, which include: in column 1, the link number; in column 2, the link type; in column 3, the agreement required between the linked strings; and in column 4, the offset from the beginning of the textual content between the linking string and the linked string. (Note only those links that are useful to illustrate the example have been shown in FIG. 11.)

A determination is made during preprocessing that the source word "voyant" is ambiguous because it can be in the form of a past participle (of the verb "voir") or a noun. Further, during preprocessing the form of the part-of-speech used in the text is disambiguated (at 312 in FIG. 3) to be a noun (see offsets 3 and 6). However, since different surface forms exists (i.e., the plural and singular form of "vonyant"), the user is still prompted for user specifications (at 314 in FIG. 3) with the user interface (in FIG. 5) to disambiguate other morphological characteristics. For example, the user interface shown in FIG. 5 prompts the user to replace all occurrences (i.e., singular and plural), plural only, or singular only. In this example, it is assumed that all occurrences (i.e., singular and plural) of the string are sought to be replaced.

Once disambiguated (at 314 in FIG. 3), the input text in FIG. 10 is searched for all occurrences of the lemma "vonyant" (at 316 in FIG. 3), and two instances of the string are identified at offsets 3 and 6. The two lexical units are replaced (at 322 in FIG. 3) with the corresponding forms of the lemma "lampe" (i.e., feminine-plural "lampes" for offset 3 and feminine-singular "lampe" for offset 6). In addition, after detecting the direct and indirect grammatical and anaphoric links involving the source string (at 318 in FIG. 3), which are identified in FIG. 11, each link is examined and any inconsistencies corrected (at 322 in FIG. 3).

Figure 12:
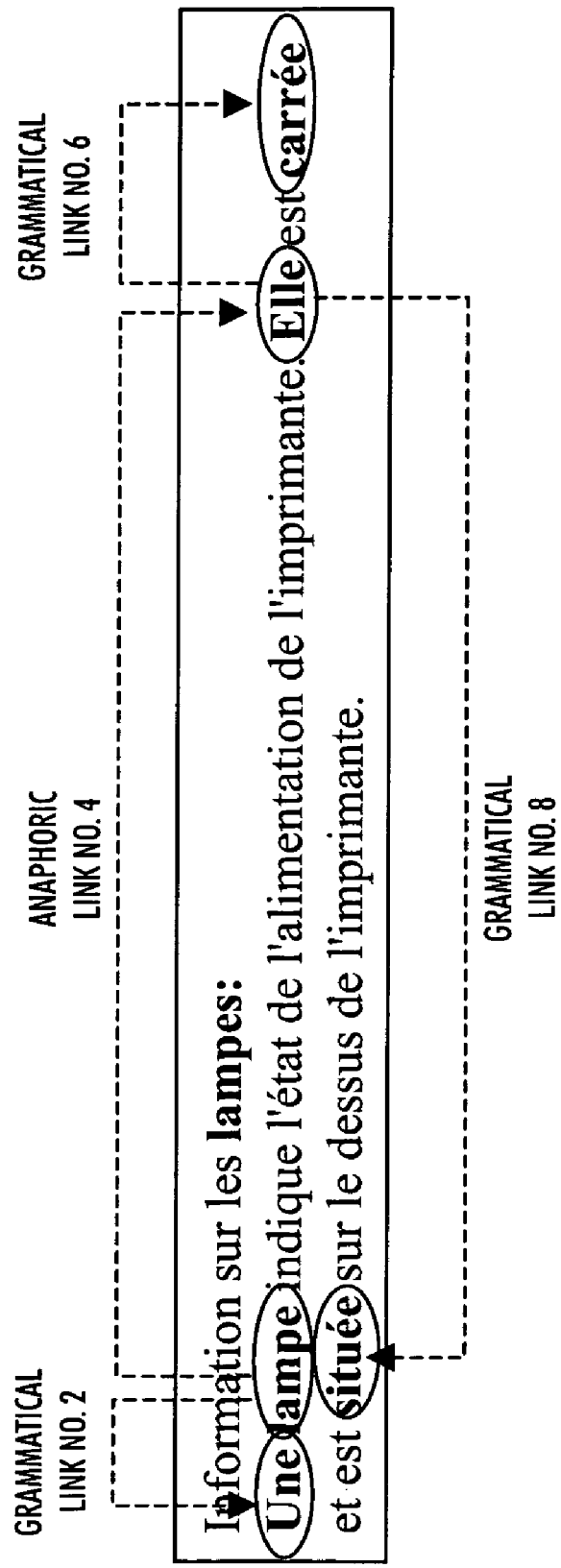

FIG. 12 illustrates the output text with corrected grammatical and anaphoric links to the source string, which are listed in FIG. 11. The text highlighted in bold in FIG. 12 illustrates that changes made as a result replacing the source string "voyant" with the target string "lampes" affect not only the source string in the textual content but also lexical items that have relations with the source string (e.g., the words "une", "elle", "carrée", and "située"). For example, link 1 between lexical unit with offset 3 (i.e., the lemma "vonyant" of surface form "voyants") and lexical unit with offset 2 (i.e., the lemma "le" of the surface form "les") expresses relations between the two lexical units that require agreement in gender and number. Because the lexical unit with offset 3 has been changed to a form that is now feminine-plural, the lexical unit with offset 2 must be checked for correctness, which is the case as its form "les" satisfies feminine-plural agreement (therefore no modification is required). In contrast, link 2 between the lexical unit with offset 6 and the lexical unit with offset 5 expresses that the two lexical units must agree in gender and number, which requires a change for the lexical unit, which is feminine-singular (i.e., "lampe"), to agree with the feminine-singular form of the lemma "un", which is "une".

Further FIG. 12 illustrates additional changes required to correct inconsistencies introduced by the string replacement that result from the anaphoric link 4 between the source string "vonyant" (masculine-singular) at offset 6 and "il" (masculine-singular) at offset 17. In order to maintain the correct agreement between the anaphoric link, the form of the lemma "il" must be changed from its masculine-singular form to a feminine-singular form to grammatically agree with the lexical unit "lampe" (which has a feminine-singular form). The update made to the input text at link 4 causes the inspection of indirect links with the source string in the input text (e.g., direct links between the anaphoric link "il" at offset 17 and other strings). The links 6 and 8 illustrate two indirect relations with the target string at offset 6 that require changes to the input text to be morphologically coherent as a result of the change due to the anaphoric link 4 (or direct relation with the target string).

In accordance with another feature of the embodiments described herein, the semantic coherence of the source string "vonyant" and the target string "lampe" are assessed (at 320 in FIG. 3) with respect to detected senses and their sense intersection. Also, in accordance with this feature, single-word or multiword expressions that are identified in the input text are examined to determine if the introduction of the target string is semantically coherent. In the input text in this example, the multiword expression "il est carre" is identified as meaning someone who follows the rules. However, the sense of the multiword expression was not the intended sense of the surrounding input text and thus the use of the target string is identified as being semantically coherent as it is used in the input text (e.g., "il" refers to a lamp and not a person).

E. Alternative Embodiments

Various alternate embodiments of the search and replace operation set forth in FIG. 3 are possible. In one alternate embodiment, corrections made to the output text (e.g., shown in FIG. 12) are tagged or highlighted with a confidence level for each correction (or non-correction) performed. The values of the confidence levels may be assigned when preprocessing input text at 304 using, for example, weighted rules when morpho-syntactically disambiguating the input text. In another alternate embodiment, the operations in FIG. 3 are performed without performing semantic coherence analysis set forth at 320 and 322. In yet another alternate embodiment, the operations in FIG. 3 are performed without correcting inconsistencies at 324 (i.e., only operations are performed to assess the semantic coherence of replacing string1 with string2). In an alternate embodiment with limited anaphoric resolution, user specifications at 314 are established after replacing occurrences of string1 with string2 (i.e., post-replacement grammatical correction).

However, those skilled in the art will appreciate that post-replacement grammatical correction is less efficient as some errors may be less readily detected after replacing string1 with string2 (i.e., anaphdric resolution is more effective before string replacement is performed). For example in the French sentence {"Un voyant est situe sur le dessus de l'imprimante. ll est carre."}, grammatical/anaphoric processing after replacing "voyant" (masculine-singular) with "lampe" (feminine-singular) will correctly identify that the determiner "un" should be replaced with "une" but will not readily identify whether there exists a link between "voyant" or "dessus" with the pronoun "il".

By way of another example in French, post-grammatical/anaphoric processing after replacing "feuillet" (which is masculine-singular) with "page" (which may be feminine or masculine depending on its meaning, as set forth above) will not readily identify whether there exists semantic coherence (i.e., whether the feminine or masculine sense of "page" was intended); note that the masculine use of "page" requires no change (i.e., as it agrees with "déchirés"), while the feminine use of "page" requires a change (i.e., as it agrees with "déchirés"), in the text: {"Les feuillets sont dechires."}. Advantageously, performing grammatical/anaphoric processing before performing string replacement avoids the introduction of ambiguities to textual content that may not be readily identified after performing string replacement with a post-editing grammatical and/or anaphoric checker.

One specific example of an application program 138 shown in FIG. 1 is a document processor for producing and editing multi-lingual (technical) documentation, where some terminology introduced during translation requires consistent replacement through a document or a collection of documents. In this embodiment, one or more of the operations performed in FIG. 3 to assess the semantic coherence of a string replacement may make use of the textual content of an original translation to disambiguate (including sense) and/or resolve inconsistencies introduced in translated textual content in which a string replacement is to take place.

In yet a further alternate embodiment, the various embodiments of the search and replace operation set forth herein operate integrally with a spell checking system. In one embodiment, spell checking may be performed before linguistically preprocessing the text at 304 in FIG. 3, so that strings identified as misspellings may be corrected so that morpho-syntactically disambiguation, anaphoric analysis, and- syntactic analysis may be performed using known (estimated) string entities.

F. Miscellaneous

In one operating embodiment, parts of the linguistic processing may be performed by XeLDA® (Xerox Linguistic Development Architecture). Further aspects of XeLDA are published in "XeLDA Overview" and "XeLDA C++ API Programmer's Guide", Xerox XeLDA® the linguistic engine, June, 2002 and U.S. Pat. No. 6,321,372. In addition, further background concerning XeLDA's recognition of multiword expressions is described in U.S. Pat. Nos. 5,642,522 and 6,393,389, which are incorporated herein by reference, and the disclosure by Bauer et al., "LOCOLEX: the translation rolls off your tongue", published in Proceedings of ACH-ALLC, Santa-Barbara, USA, 1995. Yet another method for recognizing multiword expressions is published in Patent Application Publications US 2004/0128122, entitled "Method And Apparatus For Mapping Multiword Expressions To Identifiers Using Finite-State Networks", and US 2004/0117184, entitled "Method And Apparatus For Recognizing Multiword Expressions", which are both incorporated herein by reference.

Further background on morphological analysis is disclosed in the publication "Finite State Morphology", by Beesley and Karttunen, in CSLI Publications, 2003; and on disambiguation of parts-of-speech of tokens in the publication "Tagging French text: tagset, dedicated lexicons and guesser", by Chanod and Tapanaien in Proc. From Texts To Tags: Issues In Multilingual Language Analysis, EACL SIGDAT workshop, Dublin, 1995; and on dependency analysis in the publication "Robustness beyond shallowness: incremental dependency parsing", by Ait-Mokhtar, Chanod, and Roux, in a special issue of the NLE Journal, 2002; and on lexical semantic disambiguation in the publication "introduction to the Special Issue on Word Sense Disambiguation: The State of the Art", by Ide and Veronis, in Computational Linguistics, vol. 24, no. 1, 1998.

Those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the embodiments as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method to replace a source string in a document with a target string, comprising:

preprocessing textual content via a computer by: 1) tokenizing text in said document 2) collecting information concerning morphological information, part-of-speech disambiguation, syntactic dependencies, anaphoric dependencies and semantic relationships in the textual content and 3) labeling the document with such information, wherein said tokenizing includes multiword tokenization wherein textual input is tokenized into non-isolated units;

selecting a target string that is placed at one or more locations within the document via the computer;

selecting a source string to replace the target string via the computer;

morpho-syntactically disambiguating textual content of the document via the computer;

identifying a set of string dependencies, via the computer, to detect grammatical or anaphoric dependencies, or both, between the strings in the textual content of the document;

disambiguating one or more of gender, number, or part of speech and prompting user- specified disambiguation, via the computer, if the source string or the target string have more than at least one of one possible meaning, gender, and number;

identifying occurrences of the source string in the document that satisfy the user specifications via the computer;

identifying string relations from the set of string dependencies that define direct or indirect links, or both, to the source string via the computer;

assessing whether replacing the source string with the target string is semantically coherent via the computer;

replacing each occurrences of the source string in the document that satisfy the user specifications with the target string via the computer;

correcting grammatical and anaphoric inconsistencies beyond the phrase level, via the computer, in the string relations in the document that are introduced when the source string is replaced with the target string; and outputting the document.

2. The method according to claim 1, further comprising:

identifying a first set of possible senses for the source string and a second set of possible senses for the target string via the computer;

assessing whether replacing the source string having the first set of possible senses with the target string having the second set of possible senses is semantically coherent via the computer; and outputting a warning, via the computer, when the replacement of the source string with the target string is not semantically coherent.

3. The method according to claim 2, wherein the assessment of the semantic coherence is performed independent of the textual content of the document.

4. The method according to claim 2, wherein the assessment of the semantic coherence is performed using the textual content of the document.

5. The method according to claim 2, wherein the assessment of the semantic coherence identifies one sense in common between the first set of possible senses and second set of possible senses.

6. The method according to claim 2, wherein the assessment of the semantic coherence further comprises requesting input when there exist no sense in common between the first set of possible senses and second set of possible senses, when each set includes more than one sense.

7. The method according to claim 2, further comprising:

processing the textual content of the document to identify a set of expressions that may be single-word expressions or multiword expressions via the computer;

identifying a sense for each expression in the set of expressions via the computer;

assessing, via the computer, whether the string sense and the sense of an identified expression are semantically coherent before replacing each occurrence of the source string in the textual content of the document with the target string when the source string forms part of the identified expression; and outputting a warning, via the computer, when the replacement of the source string with the target string is not semantically coherent.

8. The method according to claim 1, wherein the target string is replaced with a grammatically correct form that satisfies morphological features of the source string.

9. The method according to claim 1, further comprising using an original translation of the document in a first language to disambiguate or resolve inconsistencies introduced in translated textual content in the document in a second language.

10. The method according to claim 1, wherein the disambiguation of the source string or the target string is performed before replacing each occurrences of the source string in the document that satisfy the user specifications with the target string.

11. The method according to claim 1, wherein the morpho-syntactic disambiguation further comprises tokenizing and morphologically analyzing the textual content in the document and disambiguating identified parts-of-speech.

12. A method to replace a source string in a document with a target string, comprising:

selecting a target string that is placed at one or more locations within the document via a computer;

selecting a source string, via the computer, to replace the target string;

selecting one of more of a part of speech, a gender, and a number for each of the target string and the source string, via the computer, to replace in the document;

morpho-syntactically disambiguating textual content of the target and source strings, via the computer, using two levels of analysis: 1) examining the parts-of-speech on their own, and if ambiguities are found, 2) examining each occurrence of said source string in the textual content of the document, wherein disambiguating the textual content includes prompting user-specified disambiguation if the source string or the target string have one or more of one possible meaning, gender, and number;

identifying occurrences of the source string in the document that satisfy user specifications via the computer;

identifying a first set of possible senses for the source string and a second set of possible senses for the target string via the computer;

assessing, via the computer, whether replacing the source string having the first set of possible senses with the target string having the second set of possible senses is semantically coherent;

replacing each occurrences of the source string in the document that satisfy the user specifications with the target string via the computer;

outputting a warning, via the computer, when the replacement of the source string with the target string. is not semantically coherent;

correcting grammatical and anaphoric inconsistencies, via the computer, in the document that are introduced when the source string is replaced with the target string; and outputting the document.

13. The method according to claim 12, further comprising:

processing the textual content of the document, via the computer, to identify a set of expressions that may be single-word expressions or multiword expressions;

identifying a sense for each expression in the set of expressions via the computer;

assessing, via the computer, whether the string sense and the sense of an identified expression are semantically coherent before replacing each occurrence of the source string in the textual content of the document with the target string when the source string forms part of the identified expression;

outputting a warning, via the computer, when the replacement of the source string with the target string is not semantically coherent.

14. The method according to claim 13, further comprising:

disambiguating one or more of gender, number, or part of speech with the user specifications, via the computer, when the source string or the target string have more than one possible meaning;

identifying a set of string dependencies, via the computer, by detecting grammatical or anaphoric dependencies, or both, between strings in the textual content of the document;

identifying string relations, via the computer, from the set of string dependencies that define direct or indirect links, or both, to the source string.

15. The method according to claim 12, further comprising:

disambiguating, via the computer, one or more of gender, number, or part of speech with user specifications when the source string or the target string have more than one possible meaning;

identifying a set of string dependencies, via the computer, by detecting grammatical or anaphoric dependencies, or both, between strings in the textual content of the document;

identifying string relations from the set of string dependencies, via the computer, that define direct or indirect links, or both, to the source string;

correcting grammatical or anaphoric inconsistencies, or both, in the string relations in the document, via the computer, that are introduced when the source string is replaced with the target string.

16. A method to replace a source string in a document with a target string, comprising:

preprocessing textual content, via a computer, to: 1) tokenize text in said document, 2) collect information concerning morphological information, part-of-speech disambiguation, syntactic dependencies, anaphoric dependencies and semantic relationships in the textual content and 2) label the document with such information, wherein said tokenizing includes multiword tokenization wherein textual input is tokenized into non-isolated units;

selecting a target string, via the computer, that is placed at one or more locations within the document;

selecting a source string, via the computer, to replace the target string;

selecting one or more of a part of speech, a gender, and a number for each of the target string and the source string, via the computer, for replacement in the document;

morpho-syntactically disambiguating textual content of the target and source strings, via the computer, using two levels of analysis: 1) examining the parts-of-speech on their own, and if ambiguities are found, 2) examining each occurrence of said source string in the textual content of the document;

identifying a set of string dependencies by detecting grammatical dependencies between strings in the textual content of the document via the computer;

disambiguating one or more of gender, number, or part of speech and prompting a user to provide user-specified disambiguation, via the computer, if the source string or the target string have one or more of various possible meanings, genders, and numbers;

identifying occurrences of the source string in the document, via the computer, that satisfy the user specifications;

identifying string relations from the set of string dependencies, via the computer, that define direct or indirect links, or both, to the source string;

replacing each occurrences of the source string in the document, via the computer, that satisfy the user specifications with the target string;

correcting grammatical and anaphoric inconsistencies, beyond the phrase level, in the string relations in the document, via the computer, that are introduced when the source string is replaced with the target string; and outputting the document;

wherein the disambiguation of the source string or the target string is performed before replacing each occurrences of the source string in the document that satisfy the user specifications with the target string.

17. The method according to claim 16, further comprising:

identifying a set of string dependencies, via the computer, by detecting anaphoric dependencies between strings in the textual content of the document; and correcting anaphoric inconsistencies in the string relations in the document, via the computer, that are introduced when the source string is replaced with the target string.

18. The method according to claim 17, further comprising:

identifying a first set of possible senses for the source string and a second set of possible senses for the target string via the computer;

assessing, via the computer, whether replacing the source string having the first set of possible senses with the target string having the second set of possible senses is semantically coherent; and outputting a warning, via the computer, when the replacement of the source string with the target string is not semantically coherent.

19. The method according to claim 18, further comprising:

processing the textual content of the document, via the computer, to identify a set of expressions that may be single-word expressions or multiword expressions;

identifying a sense for each expression in the set of expressions via the computer;

assessing, via the computer, whether the string sense and the sense of an identified expression are semantically coherent before replacing each occurrence of the source string in the textual content of the document with the target string when the source string forms part of the identified expression;

outputting a warning, via the computer, when the replacement of the source string with the target string is not semantically coherent.

20. The method according to claim 19, further comprising using an original translation of the document in a first language to disambiguate or resolve inconsistencies introduced in translated textual content in the document in a second language.

* * * * *